(12) United States Patent
Singaliese et al.

(10) Patent No.: US 9,065,933 B2
(45) Date of Patent: Jun. 23, 2015

(54) ARRANGEMENT FOR NETWORK INTERFACE MODULE

(75) Inventors: Michael Singaliese, New Canaan, CT (US); Fred A. Traut, Milford, CT (US)

(73) Assignee: AFL Telecommunications LLC, Duncan, SC (US)

( * ) Notice: Subject to any disclaimer, the term of this patent is extended or adjusted under 35 U.S.C. 154(b) by 1159 days.

(21) Appl. No.: 12/597,314

(22) PCT Filed: Jun. 25, 2009

(86) PCT No.: PCT/US2009/048655
§ 371 (c)(1),
(2), (4) Date: Oct. 23, 2009

(87) PCT Pub. No.: WO2009/158496
PCT Pub. Date: Dec. 30, 2009

(65) Prior Publication Data
US 2011/0188650 A1    Aug. 4, 2011

Related U.S. Application Data

(60) Provisional application No. 61/075,713, filed on Jun. 25, 2008, provisional application No. 61/093,354, filed on Aug. 31, 2008.

(51) Int. Cl.
| | |
|---|---|
| *H04M 1/00* | (2006.01) |
| *H04M 11/06* | (2006.01) |
| *H01R 24/40* | (2011.01) |
| *H01R 31/00* | (2006.01) |
| *H01R 103/00* | (2006.01) |
| *H04M 1/02* | (2006.01) |

(52) U.S. Cl.
CPC ............ *H04M 11/062* (2013.01); *H01R 24/40* (2013.01); *H01R 31/005* (2013.01); *H01R 2103/00* (2013.01); *H04M 1/0293* (2013.01)

(58) Field of Classification Search
CPC .......... H04M 3/30; H04M 3/40; H04M 5/02; H04M 19/005; H04M 19/02; H04M 1/02; H04M 1/0237; H04M 1/0295; H04M 1/05; H04M 1/06; H04Q 1/10; H04Q 1/028
USPC ............. 379/399.01–413.04, 413.02–413.04, 379/12.13, 167.12, 330, 428.01–431, 447, 379/12, 321, 329
See application file for complete search history.

(56) References Cited

U.S. PATENT DOCUMENTS

| | | | | |
|---|---|---|---|---|
| 6,011,831 | A * | 1/2000 | Nieves et al. | 379/21 |
| 2001/0053625 | A1 * | 12/2001 | Vo et al. | 439/409 |
| 2003/0086561 | A1 * | 5/2003 | McLean et al. | 379/413.02 |
| 2007/0160195 | A1 * | 7/2007 | Vo et al. | 379/413.04 |
| 2007/0283406 | A1 * | 12/2007 | Blake et al. | 725/127 |

* cited by examiner

*Primary Examiner* — Akelaw Teshale
(74) *Attorney, Agent, or Firm* — Sughrue Mion, PLLC

(57) ABSTRACT

An apparatus used to interface to a communications network is provided. Specifically, the apparatus is for placement in a network interface device (NID). An interface module that may be used as a splitter and balun for telephone and data services is also provided. The interface module may include a housing containing a pivotal rearward extending portion, in which a bottom of the pivotal rearward extending portion is above a bottom of an adjacent portion of the housing providing an open region below the bottom of the pivotal rearward extending portion, at least one wire extending from a front portion of the housing and connecting a balanced pair of telephone wires from the telephone company to the customer premises, and a coaxial connector disposed on a side of the pivotal rearward extending portion.

14 Claims, 4 Drawing Sheets

ARRANGEMENT FOR NETWORK INTERFACE MODULE

This application claims the benefit of the Provisional Application entitled ARRANGEMENT FOR NETWORK INTERFACE MODULE filed Jun. 25, 2008. The disclosure of the prior provisional application is hereby incorporated by reference in its entirety.

BACKGROUND OF THE INVENTION

1. Field of the Invention

Exemplary embodiments of the present invention relate to an apparatus used to interface to a communications network. More particularly, the embodiments relate to those apparatus for placement in a network interface device (NID). Exemplary embodiments also relate to a configuration for an interface module that may be used as a splitter and balun for telephone and data services.

2. Background Art

A demarcation point, referred to as a network interface device (NID), is typically provided between a telephone subscriber's premises line and an incoming line from a telephone service provider. An interface device or module, typically used at a NID for physically connecting a subscriber's telephone line with a telephone service provider line, is referred to as a "subscriber line module" or "subscriber bridge." Such an interface device or module is typically mounted within a NID enclosure, which is commonly mounted to a pole or to the outside wall of the premises of a telephone subscriber. The NID enclosure customarily includes a base section that is secured in a conventional manner to a subscriber's premises, and to which a telephone subscriber line module is affixed. Telephone service provider lines enter the NID enclosure and are connected to the telephone line of a subscriber's premises via a subscriber line module.

With the advent of DSL and VDSL services, the telephone subscriber may have both telephone and, for example, Internet data services supplied on a single line or cable from the telephone company. The NID becomes more complex in that it must contain circuitry to separate the signals of different frequencies coming in from the telephone company on a single line, into the subscriber's telephone, and the subscriber's computer. Further, the line from the telephone company is often a balanced twisted pair, which must be impedance matched to an unbalanced coaxial cable on the customer's premises.

Generally, there have been a variety of interface modules that have been designed to meet these needs. These are usually of a standard shape that "snap" into internal mechanical features of the NID enclosure. However, as the number of interface modules in an NID enclosure becomes larger, and due to the complexity of the larger number of connections needed when both telephone service and data service are provided, the wiring inside the enclosures to the telephone company cable, the telephone, and the computer at the customer premises can become unwieldy. Also, conventional interface modules require at least two line spaces thereby reducing the amount available line spaces available for additional services or for future expansion. Therefore, a better mechanical design for the interface modules is required to alleviate these problems.

SUMMARY OF THE INVENTION

Exemplary embodiments of the present invention provide an interface module having an outer shape that makes connection and wiring in a standard NID enclosure easier and neater.

The embodiments also provide an interface module that moves from a common 2 line space portion to a single line space portion.

The embodiments additionally provide an interface module that meets the above objective and conforms to standard interface module "snap-in" geometry.

The embodiments further provide an interface module that will accept a coaxial cable connector at the end of the line from the customer premises.

The embodiments to provide an interface module that acts as a splitter and a balun.

Specifically, exemplary embodiments relate to an interface module for a network interface device (NID), the interface module including a housing containing a pivotal rearward extending portion wherein a bottom of the pivotal rearward extending portion is above a bottom of an adjacent portion of the housing providing an open region below the bottom of the pivotal rearward extending portion, at least one wire that extends from a front potion of the housing and connects a balanced pair of telephone wires from the telephone company to the customer premises, and a connector on the pivotal extending portion; wherein the interface module fits within a single line space.

These objects and others achieved in accordance with the embodiments of the present invention will become apparent from the description below.

Exemplary embodiments of the present invention address at least the above problems and/or disadvantages as well as other disadvantages of which have not been mentioned. Additionally, the present invention is not required to overcome the disadvantages described above, and the exemplary embodiments of the present invention may not totally overcome any of the problems described above.

BRIEF DESCRIPTION OF THE DRAWINGS

Many aspects of the invention can be better understood with reference to the following drawings. The components in the drawings are not necessarily to scale. Instead, emphasis is placed on clearly illustrating the principles of the present invention.

DETAILED DESCRIPTION OF THE PREFERRED EMBODIMENT

Figure 1:
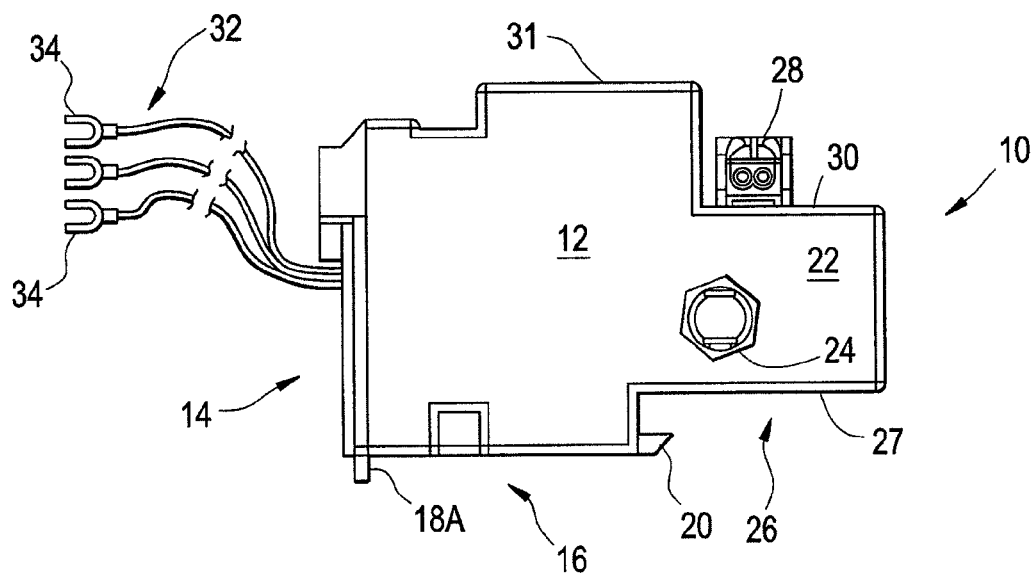
FIG. 1 is a side elevational outline view of an embodiment of an interface module.

FIGS. 1 to 5 show various views of an exemplary embodiment of an interface module 10. Although the present invention will be described with reference to a single embodiment shown in the drawings, it should be understood that the present invention can be embodied in many alternate forms. In addition, any suitable size, shape or type of elements or materials could be used. For example, while a preferred material for the housing 12 of interface module 10 is Lexan® BPL 1000 polycarbonate in accordance with standard UL-94V-0, other suitable materials may be used.

The front end 14 of housing 12 and the bottom 16 of housing 12 are configured with appropriate slots, grooved front vertically extending protrusions 18A and 18B, and a horizontal protrusion 20 which are designed to allow housing 12 to "snap" into a standard network interface device (NID) enclosure, and will not be described in further detail, because this configuration is well know in the art. The illustrated configuration matches at least two standard NID enclosures or boxes, and one skilled in the art can readily design adaptors to allow interface module 10 to be accepted in other available enclosures.

Figure 2:
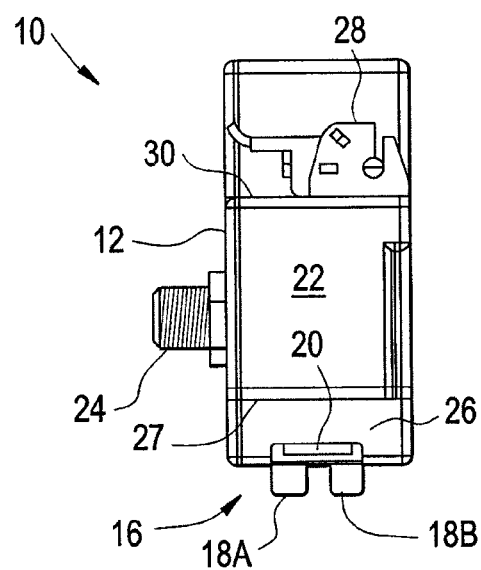
FIG. 2 is a rear elevational outline view of an embodiment of an interface module.
Figure 3:
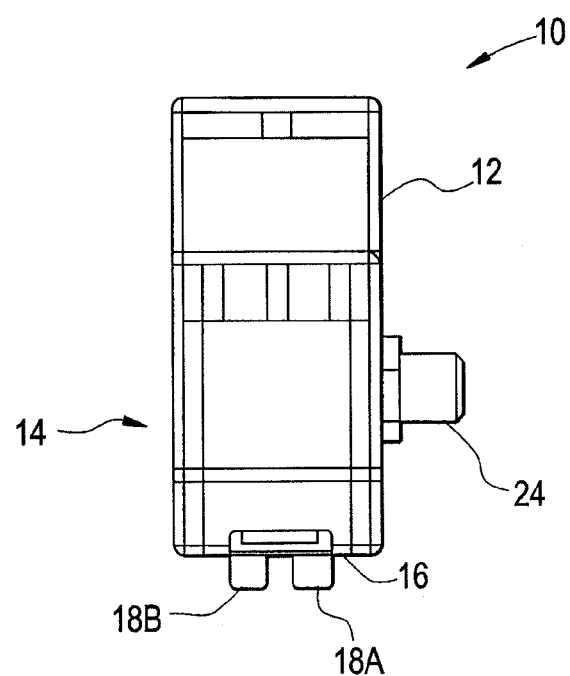
FIG. 3 is an alternate rear view of an embodiment of an interface module.
Figure 4:
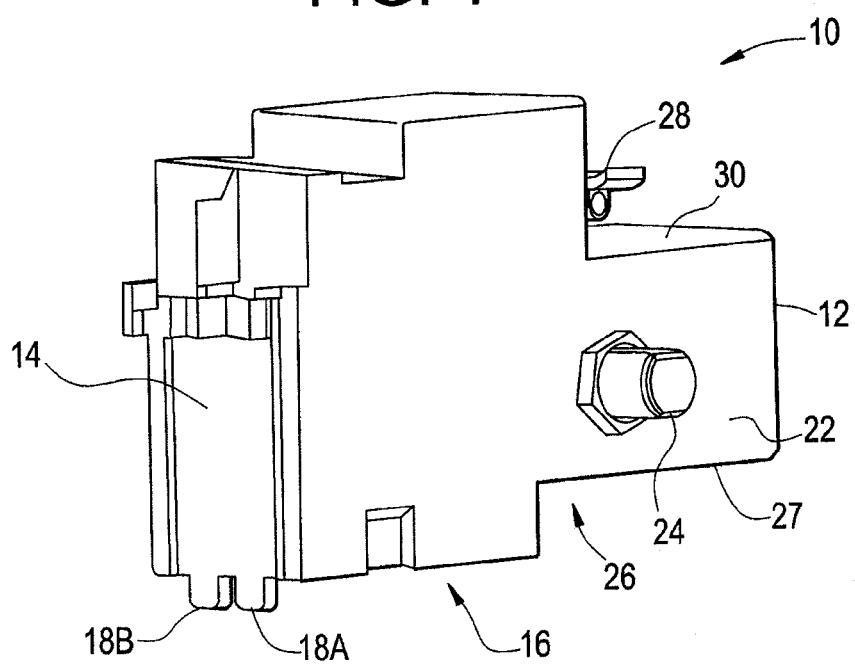
FIG. 4 is a front perspective view of an embodiment of an interface module.
Figure 5:
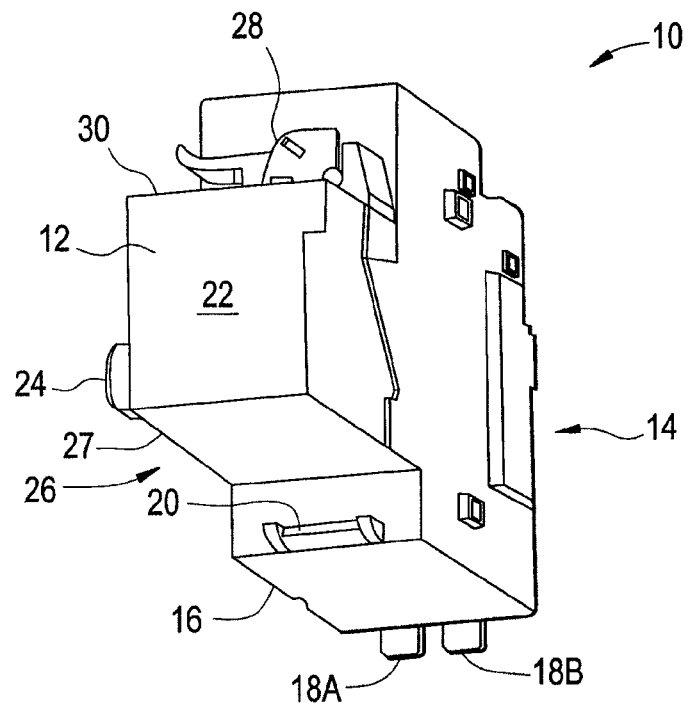
FIG. 5 is a rear perspective view of an embodiment of an interface module.

While dimensions in inches, which allow housing 12 to be received in such a NID enclosure are shown in FIG. 1 and FIG. 2, it will be understood that with other standard NID enclosures, the dimensions and configuration of housing 12 can be appropriately modified to be compatible with such other NID enclosures while fitting within a single line space, wherein a line space is the spacing or footprint in which an add-on module or interface module is installed. The dimensions set forth in FIGS. 1 and 2 typically represent the dimensions within a single line within an NID. For example, the housing 12 may be a Tii module, an s-footprint, or a k-footprint, but is not is not limited to these examples.

A rearwardly extending portion 22 of housing 12 has affixed thereto a coaxial connector 24 of a type well know in the art to which a standard coaxial cable (not shown), such as a 75 ohm coaxial cable of the type used in cable television and data services systems, which terminates in a mating connector (also not shown), may be connected. It will be understood that such coaxial cable (not shown) extends to the customer premises for connection to suitable interface devices, so that connection may be made to computer modems and/or television set top boxes, as the case may be. However, it is understood that the connector is not limited to a coaxial connector, and may be replaced with other forms of connection or connector types.

Rearwardly extending portion 22 of housing 12 is not of great height, and does not extend down as far as the bottom 16 of housing 12, thus providing a region 26 between a lower surface 27 of portion 22 and the NID enclosure into which interface module 10 is installed. The presence of this region provides two distinct functionalities.

First, it is possible to pivot the rear portion of interface module 10 so as to facilitate and allow its installation in a standard NID enclosure.

Second, once interface module 10 is in place in the NID enclosure, coaxial cables extending to other interface modules 10 in the same enclosure may be routed under rearwardly extending portion 22 of housing 12, to the coaxial connectors 24 of those interface modules. This eliminates the requirement of running the cables around the outside of the NID enclosure, and then making a sharp turn in the respective coaxial cable at the point where it turns between two interface modules 10, and another sharp turn so that its respective connector may be positioned to connect to a respective coaxial connector 24. This routing, with two sharp turns, crimps the coaxial cable, thus locally altering its impedance and adversely affecting its long term life.

In accordance with the present invention, the coaxial cable is simply routed under the rearwardly extending portion 22 of housing 12 of the adjacent interface module 10, and the coaxial connector which terminates the coaxial cable can connect to coaxial connector 24 with relatively gradual and minor changes in direction. Adverse effects on local impedance and life of the cable are for the most part, eliminated.

In accordance with the invention, to simply electrical connection, a stripless electrical connector 28, of the type well know in the art, may be disposed on the upper surface 30 of rearwardly extending portion 22 of housing 12. Connecting the generally balanced pair wiring to the customer premises for conventional telephones is greatly simplified. These wires may extend over upper surface 30 of adjacent interface modules, to the appropriate connector 28, and the electrical connection easily made, without the need to strip the wires of their insulation. Additionally, the upper surface 30 may be located at a position lower than the top most surface 31, but it is understood that the upper surface 30 may be located at other positions providing that the housing 12 and stripless connector 28 can fit underneath a cover of the NID.

A set of wires 32 (FIG. 1) from housing 12 of interface module 10 may extend from the front potion of housing 10 for electrical connection to the generally balanced pair of telephone wires from the telephone company to the customer premises. Wires 32 may include a standard red and green insulated twisted pair of #24 American wire gauge (AWG) wire having one and one half to two turns per inch, for telephone ring and tip connections, respectively. A yellow ground wire of the same type is also included in the set of wires. All wires may have a length of approximately seven inches, and are terminated with spade lugs 34 for connection to the terminals of wire from the telephone company within the NID enclosure into which interface module 10 is installed.

Housing 12 of interface module 10 may contain a splitter, a balun and appropriate filter circuitry of a type well known in the art. For example, a splitter compliant with the local ITT-T G.993.2 VDSL2 band plan, such as hand plan 8A (25 kilohertz (kHz) to 8.5 megahertz (MHz)) and GR-1089-CORE may be disposed therein. Signals on an unbalanced coaxial cable (generally 75 ohms impedance) which connect to coaxial connector 24 are matched to a balanced line (not shown) of approximately 100 ohms from the telephone company, connected to terminals to which lugs 34 are connected.

An appropriate low pass filter may be included to filter, condition and assist in frequency limiting these signals.

Additionally, the circuitry within housing 12 may be designed to concurrently conform to the standards of other types of data services, such as for example, but not limited to, Home Phoneline Networking Alliance (HPNA) standards.

The side of housing 12 opposite to that on which coaxial connector 24 is mounted, may be a portion of housing 12 which serves as a removable cover, that is removed for placement of a circuit board or boards (preferably a single circuit board) containing the circuitry within housing 12. Suitable electrical connections are then made to coaxial connector 24 and stripless connector 28, while wires 32 may extend from a circuit board through a tight fitting opening (not shown). A suitable insulating and mechanically shock absorbing potting material, such as a polyurethane or epoxy, which cures in place, may then be used to fill the remaining void spaces in housing 12, and cured in place, with the cover also in place to close and seal housing 12.

It should be understood that the foregoing description is only illustrative of the invention. Various alternatives and modifications can be devised by those skilled in the art without departing from the invention. Accordingly, the present invention is intended to embrace all such alternatives, modifications and variances.

What is claimed:

1. An interface module for a network interface device (NID) comprising:
    a housing containing a front end, a pivotal rearward extending portion at a side of the housing that is opposite to said front end, and a first and second bottom side;
    wherein said first bottom side is adjacent to said front end and said second bottom side extends along a bottom surface of said pivotal rearward extending portion;

wherein the entire length of said second bottom is above said first bottom, providing an open region below the second bottom, at least one wire that extends from said front end of the housing and that is configured to connect a balanced pair of telephone wires from the telephone company to the customer premises, and a connector on the pivotal rearward extending portion;

wherein the interface module fits within a single line space.

2. The interface module of claim 1, wherein the connector is a coaxial connector.

3. The interface module of claim 1, wherein the connector is disposed on a side of the pivotal extending portion.

4. The interface module of claim 1, wherein a line space is the spacing or footprint in which an add-on module or interface module is installed.

5. The interface module of claim 1, wherein the interface module has an s-footprint or k-footprint, or the dimensions of a Tii module.

6. The interface module of claim 1, further comprising at least one grooved front vertically extending protrusion and a horizontal protrusion that are both used to snap the housing into the NID.

7. The interface module of claim 1, further comprising a stripless electrical connector disposed on the upper surface of the pivotal rearward extending portion.

8. The interface module of claim 1, wherein the at least one wire comprises: a standard insulated twisted pair of #24 American wire gauge wire having one and one half to two turns per inch for telephone ring and tip connections, and a ground wire of the same type.

9. The interface module of claim 1, wherein the at least one wire has a length of approximately seven inches.

10. The interface module of claim 1, further comprising at least one spade lug for terminating the at least one wire.

11. The interface module of claim 1, wherein the housing contains a splitter and balun.

12. The interface module of claim 1, wherein the housing comprises appropriate filter circuitry.

13. The interface module of claim 1, further comprising a low pass filter to condition and frequency limit signals.

14. The interface module of claim 1, further comprising a removable cover disposed on a side of the housing opposite to that on which the coaxial connector is mounted.

\* \* \* \* \*